United States Patent
Bhola et al.

(10) Patent No.: US 8,020,193 B2
(45) Date of Patent: Sep. 13, 2011

(54) SYSTEMS AND METHODS FOR PROTECTING WEB BASED APPLICATIONS FROM CROSS SITE REQUEST FORGERY ATTACKS

(75) Inventors: Sumeer K. Bhola, Hastings On Hudson, NY (US); Todd E. Kaplinger, Raleigh, NC (US); Michael Steiner, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 463 days.

(21) Appl. No.: 12/254,494

(22) Filed: Oct. 20, 2008

(65) Prior Publication Data

US 2010/0100927 A1    Apr. 22, 2010

(51) Int. Cl.
*G06F 17/00* (2006.01)
*G06F 7/04* (2006.01)
*G06F 15/16* (2006.01)
*G06F 17/30* (2006.01)
*H04L 29/06* (2006.01)
*H04N 7/16* (2006.01)

(52) U.S. Cl. ......... 726/1; 726/4; 726/6; 726/9; 726/26; 726/27

(58) Field of Classification Search ............... None
See application file for complete search history.

(56) References Cited

U.S. PATENT DOCUMENTS

| | | | |
|---|---|---|---|
| 2007/0234409 A1* | 10/2007 | Eisen | 726/6 |
| 2008/0083032 A1 | 4/2008 | Yamaoka | |
| 2008/0115201 A1* | 5/2008 | Sturms et al. | 726/9 |
| 2008/0222299 A1* | 9/2008 | Boodaei | 709/229 |
| 2008/0222736 A1* | 9/2008 | Boodaei et al. | 726/27 |
| 2008/0263650 A1* | 10/2008 | Kerschbaum | 726/9 |
| 2008/0320567 A1* | 12/2008 | Shulman et al. | 726/4 |
| 2009/0249489 A1* | 10/2009 | Livshits et al. | 726/26 |

OTHER PUBLICATIONS http://baseunderattack.com/2008/04/18/ruby-on-rails-and-csrf-protection/.
http://www.json.org.
http://www.owasp.org.
http://www.fortifysoftware.com/servlet/downloads/public/JavaScript_Hijacking.pdf.
http://en.wikipedia.org/wiki/Cross-site_request_forgery.
http://www.informatik.uni-hamburg.de/SVS/papers/2006_owasp_RequestRodeo.pdf.

* cited by examiner

*Primary Examiner* — Shin-Hon Chen
(74) *Attorney, Agent, or Firm* — Fox Rothschild, LLP; Robert J. Sacco

(57) ABSTRACT

Computer implemented methods (200) for protecting web based applications (110, 114) from Cross Site Request Forgery (CSRF) attacks. The methods involve (204) classifying each resource offered by a web server application as a CSRF-protected resource or a not-CSRF-protected resource. The methods also involve (214, . . . , 222) performing a user authentication, (224) initializing an authentication-token, and (226) initializing a CSRF protection secret that is used to validate CSRF protection parameters contained in resource identifiers for the resources. The methods further involve (228) performing a server-side rewriting process (300) to add the CSRF protection parameter to the resource identifiers for the resources and/or (230) performing a client-side rewriting process to add the CSRF protection parameter to a resource identifier for a second resource (e.g., a resource created at a client computer (102)).

20 Claims, 6 Drawing Sheets

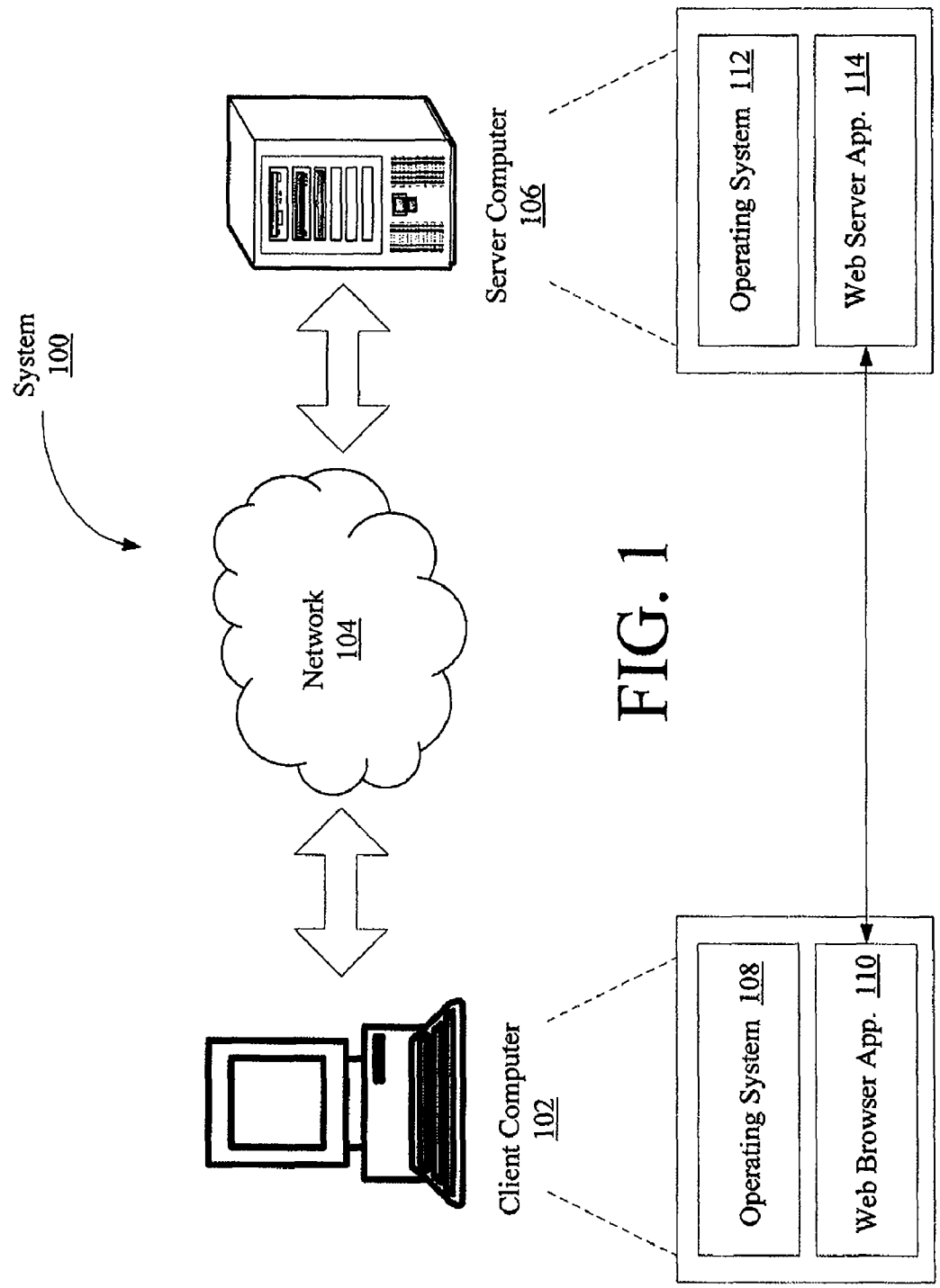

Go To FIG. 2B

SYSTEMS AND METHODS FOR PROTECTING WEB BASED APPLICATIONS FROM CROSS SITE REQUEST FORGERY ATTACKS

BACKGROUND OF THE INVENTION

1. Statement of the Technical Field

The present invention relates to systems and methods for browsing the World Wide Web (WWW). More particularly, the present invention relates to systems and methods for protecting web based applications from Cross Site Request Forgery (CSRF) attacks.

2. Description of the Related Art

Web-based applications are subject to CSRF attacks. CSRF is generally a method for forging and sending requests across Web sites for the purpose of causing damage to certain Web sites. CSRF attacks are powerful and straight forward attacks that can totally subvert the security of web applications. CSRF attacks target both the integrity and the confidentiality of a web application. For example, a CSRF attack can cause changes on a server without a user's approval and/or cause private data to be disclosed to an unknown third party.

CSRF attacks typically occur when a user opens a rogue web application in parallel to a target web application (e.g., in a separate browser tab). CSRF attacks can also occur subsequent to a visit to the target web application by a user (if the web application does not clean up user credentials when the user navigates away from the target web application). The rogue web application can misuse a user's privilege to cause sever-side actions on a user's behalf and to retrieve confidential data from requests (e.g., JavaScript Object Notation requests) using JavaScript Hijacking attacks.

Some safeguards and implementations exist to prevent CSRF attacks. However, these safeguards and implementations suffer from certain drawbacks. For example, the conventional safeguards and implementations employing POST requests (rather than GET requests) offer incomplete security against CSRF attacks. The conventional safeguards and implementations require a relatively large amount of effort and time to develop.

SUMMARY OF THE INVENTION

This Summary is provided to comply with 37 C.F.R. §1.73, requiring a summary of the invention briefly indicating the nature and substance of the invention. It is submitted with the understanding that it will not be used to interpret or limit the scope or meaning of the claims.

Embodiments of the present invention relate to systems and computer implemented methods for protecting web based applications from Cross Site Request Forgery (CSRF) attacks. The methods generally involve classifying each resource offered by a web server application as a CSRF-protected resource or a not-CSRF-protected resource. The methods also involve performing a user authentication. Thereafter, an authentication-token is initialized. A CSRF protection secret is also initialized that is to validate CSRF protection parameters contained in resource identifiers for the first resources. Subsequent to initializing the CSRF protection secret, a server-side rewriting process is performed to add the CSRF protection parameter to the resource identifiers for the first resources. A client-side rewriting process can also be performed to add the CSRF protection parameter to a resource identifier.

BRIEF DESCRIPTION OF THE DRAWINGS

Embodiments will be described with reference to the following drawing figures, in which like numerals represent like items throughout the figures, and in which:

FIG. 1 is a schematic view of a system for protecting web based applications from CSRF attacks according to an embodiment of the present invention.

DETAILED DESCRIPTION OF THE PREFERRED EMBODIMENTS

Figure 2A:
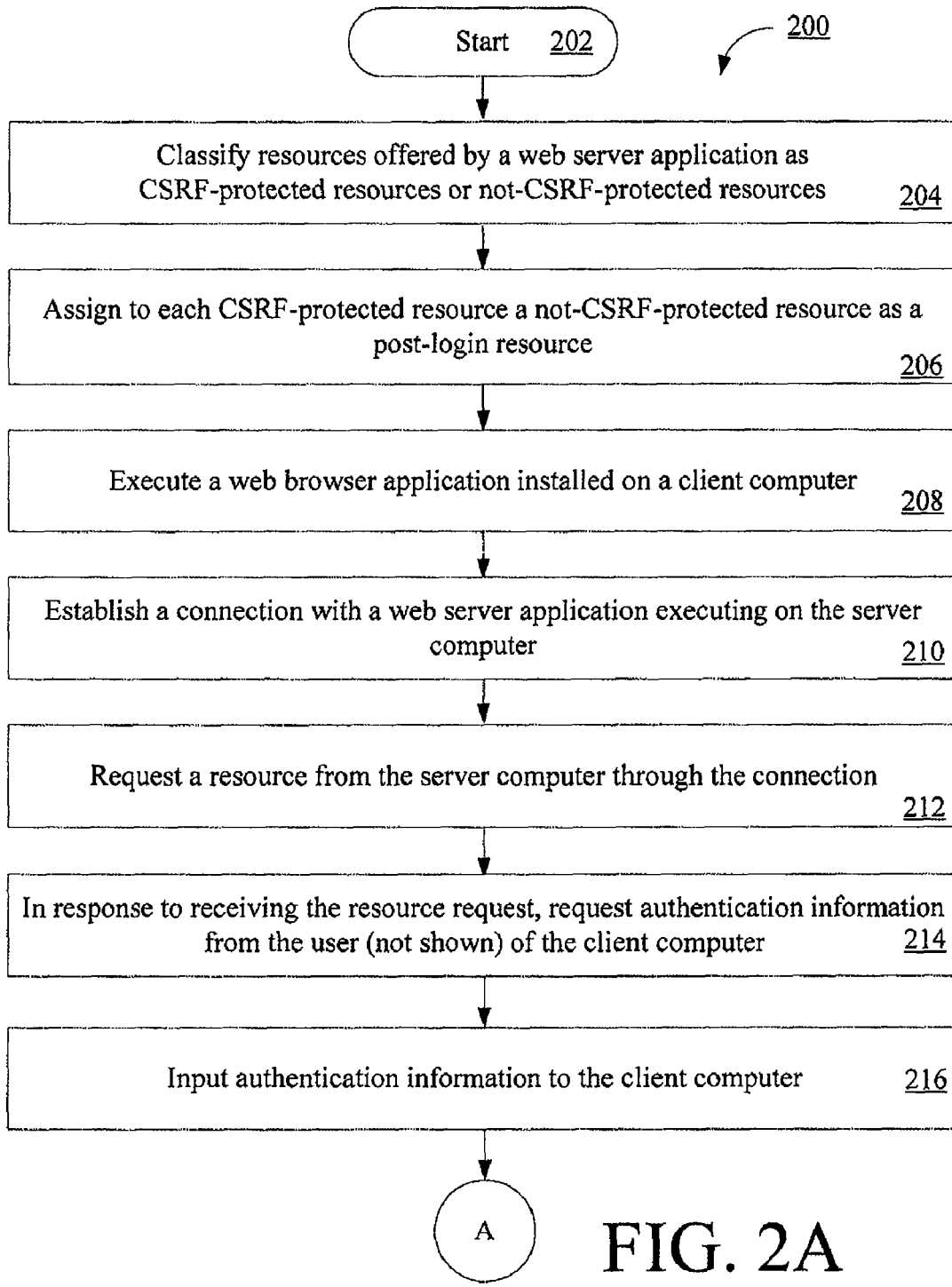
FIGS. 2A-2C collectively provide a flow diagram of an exemplary method for protecting web based applications from CSRF attacks.

The following detailed description is directed to systems, methods, and computer-readable media for protecting web based applications from CSRF attacks. The method embodiments of the present invention generally involve the acts of (1) classifying resources offered by a web server application as CSRF-protected resources or not-CSRF-protected resource and (2) providing CSRF protection to web applications. The term "resource", as used herein, refers to every thing or entity that can be identified, named, addressed or handled, in any way whatsoever, in the World Wide Web (WWW) at large, or in any networked information system. Act (2) generally involves initializing a CSRF protection secret in a web browser program at the end of a user authentication, performing a server-side rewriting operation, performing a client-side rewriting operation, requesting a resource, and authorizing the resource. The term "CSRF protection secret", as used herein, refers to a token generated at a server computer identifying certain privileges (e.g., the privilege of accessing a particular banking web page) of a user of a client computer.

While the subject matter described herein is presented in the general context of program modules that execute in conjunction with the execution of an operating system and application programs on a computer system, those having ordinary skill in the art will recognize that other implementations may be performed in combination with other types of program modules.

Generally, program modules include routines, programs, components, data structures, and other types of structures that perform particular tasks or implement particular abstract data types. Moreover, those having ordinary skill in the art will appreciate that the subject matter described herein may be practiced with other computer system configurations, including hand-held devices, multiprocessor systems, microprocessor-based or programmable consumer electronics, minicomputers, mainframe computers, and the like.

The subject matter described herein is also described as being practiced in a distributed computing environment where tasks are performed by remote processing devices that are linked through a communications network and wherein program modules may be located in both local and remote memory storage devices. It should be appreciated, however, that the implementations described herein may also be utilized in conjunction with stand-alone computer systems and other types of computing devices. It should also be appreciated that although reference is made herein to the Internet, the embodiments presented herein may be utilized with any type of local area network ("LAN") or wide area network ("WAN").

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for protecting web based application from CSRF attacks will be described.

Referring now to FIG. 1, there is provided a schematic illustration of a system 100 for protecting web based applications from CSRF attacks. As shown in FIG. 1, the system 100 comprises a client computer 102, a network 104, and a server computer 106. Although a single client computer 102 and a single server computer 106 are shown in FIG. 1, embodiments of the present invention are not limited in this regard. For example, system 100 can comprise a plurality of client computers 102 and server computers 106.

The computers 102, 106 are communicatively coupled to one another through respective connections to the network 104. According to an embodiment of the present invention, the network 104 comprises an Internet. However, it should be appreciated that the network 104 can also comprise a Local Area Network (LAN), a Wide Area Network (WAN) or any other suitable network for connecting the computers 102, 106.

The computers 102, 106 can be any multimode communication device capable of supporting wire line and/or wireless communication technologies. Such multimode communication devices include, but are not limited to, cell phones, personal computers, laptops, and personal digital assistants. In the case of wire line communications, the computers 102, 106 can utilize xDSL, cable, or public switch telephone network (PSTN) telephony interfaces for communicating over the network 104, which can include hybrid technologies that support circuit-switched packet-switched communications. The computers 102, 106 can also support accessory interfaces (e.g., universal serial buses, Firewires, and other connectivity technologies).

The computers 102, 106 can further support any number of wireless communication protocols. Such communication protocols include, but are not limited to, 802.xx protocols defined by the Institute of Electrical and Electronics Engineers (IEEE). For instance, the computers 102, 106 can utilize long-range wireless access technologies (e.g., cellular, software defined radio and WiMAX) and/or short-range wireless technologies to communicate with the network 104. Cellular access technologies include, but are not limited to, CDMA-1X, UMTS/HSDPA, GSM/GPRS, TDMA/EDGE, EV/DO, and next generation technologies as they emerge. Short-range wireless technologies include, but are not limited to, WiFi, Bluetooth, Zigbee, and cordless communications (e.g., digital enhanced cordless telecommunications).

A number of software components utilized by the computers 102, 106 are shown in FIG. 1. In particular, the client computer 102 includes an operating system 108 for controlling the operation of a networked desktop or laptop computer. Similarly, the server computer 106 includes an operating system 112 for controlling the operation of a networked server computer. Operating systems are well known to those having ordinary skill in the art, and therefore will not be described herein. However, it should be understood that any operating system can be employed by the computers 102, 106.

The client computer 102 also includes a web browser application 110 (also referred to herein as a "browser"). Browsers are well known to those having ordinary skill in the art, and therefore will not be described herein. However, it should be understood that the browser 110 is generally operative to establish a connection with a web server application 114 executing on the server computer 106, request resources (e.g., web pages) from the server computer 106 through the connection, receive content (e.g., HTML content) from the server computer 106 through the connection, and execute the content (e.g., display a web page to a user of the client computer 102). As should be understood, a resource can require a user authentication. After a user (not shown) has been authenticated, a session is initiated. The user authentication typically involves obtaining confidential data from the user (not shown) of the client computer 102, communicating the confidential data (e.g., a user identification and/or a password) to the server computer 106, and verifying at the server computer 106 the user's identity using the confidential data.

Notably, the system 100 implements a method for protecting the web applications from CSRF attacks. The following FIGS. 2-4 and accompanying text illustrate such a method for protecting web based applications (e.g., browsers) from CSRF attacks. It should be appreciated, however, that the method disclosed herein is provided for purposes of illustration only and that embodiments of the present invention are not limited solely to the method shown.

Referring now to FIG. 2, there is provided a flow diagram of an exemplary method 200 for protecting web applications (e.g., the web browser application 110 of FIG. 1 and the web server application 114 of FIG. 1) from CSRF attacks. As shown in FIG. 2, the method 200 begins with step 202 and continues with step 204. In step 204, resources offered by a web server application (e.g., the web server application 114 of FIG. 1) are classified as CSRF-protected resources or not-CSRF-protected resources. This classification can be performed by an administrator (not shown) of the web server application. As noted above, the term "resources" refers to every thing or entity that can be identified, named, addressed or handled, in any way whatsoever, in the World Wide Web (WWW) at large, or in any networked information system.

According to an embodiment of the present invention, the resources include targets of Uniform Resource Locators (URLs), targets of Uniform Resource Identifiers (URIs), Hyper Text Markup Language (HTML) pages, JavaScript Pages (JSPs), PHP pages, Ruby Script files, Extensible Markup Language (XML) files, HTML documents, and HTML images. Select secure resources (also referred to herein as "select non-public resources") can be classified as CSRF-protected resources. Unsecured resources (also referred to herein as "public resources") and/or select secure resources (or select non-public resources) can be classified as not-CSRF-protected resources. Secure resources include banking web pages, law firm web based intranets, government web based intranets, and other web pages including confidential information. Unsecured resources include news station web pages and other web pages including non-confidential information. Embodiments of the present invention are not limited in this regard.

Subsequent to classifying the resources, the method 200 continues with step 206. In step 206, each of the CSRF-protected resources is assigned a post-login resource. The post-login resource is chosen to be an existing designated resource which is a not-CSRF-protected resource. It should be understood that step 206 is performed for ensuring that the user (not shown) of the client computer accesses a "safe" web page after completion of a user authentication to prevent the occurrence of a malicious act (e.g., the erasure of emails or the transfer of funds from a checking account). This not-CSRF-protected resource assignment can also be performed by the administrator (not shown) of the web server application.

Upon completing step 206, the method 300 continues with step 208 where a web browser application (e.g., the web browser application 110 of FIG. 1) is executed by a user (not shown) of a client computer (e.g., the client computer 102 of FIG. 1). In step 210, a connection between the web browser application and a web server application is established. As should be understood, the web server application is an application executing on the server computer (e.g., the server computer 106 of FIG. 1). Accordingly, the client computer communicates with the server computer over a network (e.g., the network 104 of FIG. 1) to establish a connection between the web applications thereof.

Once a connection is established between the web applications, step 212 is performed. Step 212 involves requesting a resource from the server computer through the connection. This request is generated by the client computer and communicated to the server computer via the network. In response to receiving the resource request at the server computer, step 214 is performed where authentication information is requested from the user (not shown) of the client computer. Such authentication information can include, but is not limited to, a user identification and a password. Step 214 can generally involve communicating a message including a request for authentication information from the server computer to the client computer. Step 214 can also involve displaying a "login" display to the user (not shown) of the client computer. "Login" displays are well known to those having ordinary skill in the art, and therefore will not be described herein. However, it should be understood that the "login" display can include prompts for inputting authentication information.

In step 216, the user (not shown) of the client computer inputs authentication information using a user interface (not shown) thereof. The user interface (not shown) can comprise input devices, output devices, and software routines configured to allow a user to interact with and control software applications installed on the user computer. Such input and output devices include, but are not limited to, a display screen (not shown), a speaker (not shown), a keypad (not shown), a directional pad (not shown), a directional knob (not shown), and a microphone (not shown). Thereafter, the method 200 continues with a step 218 of FIG. 2B.

Figure 2B:
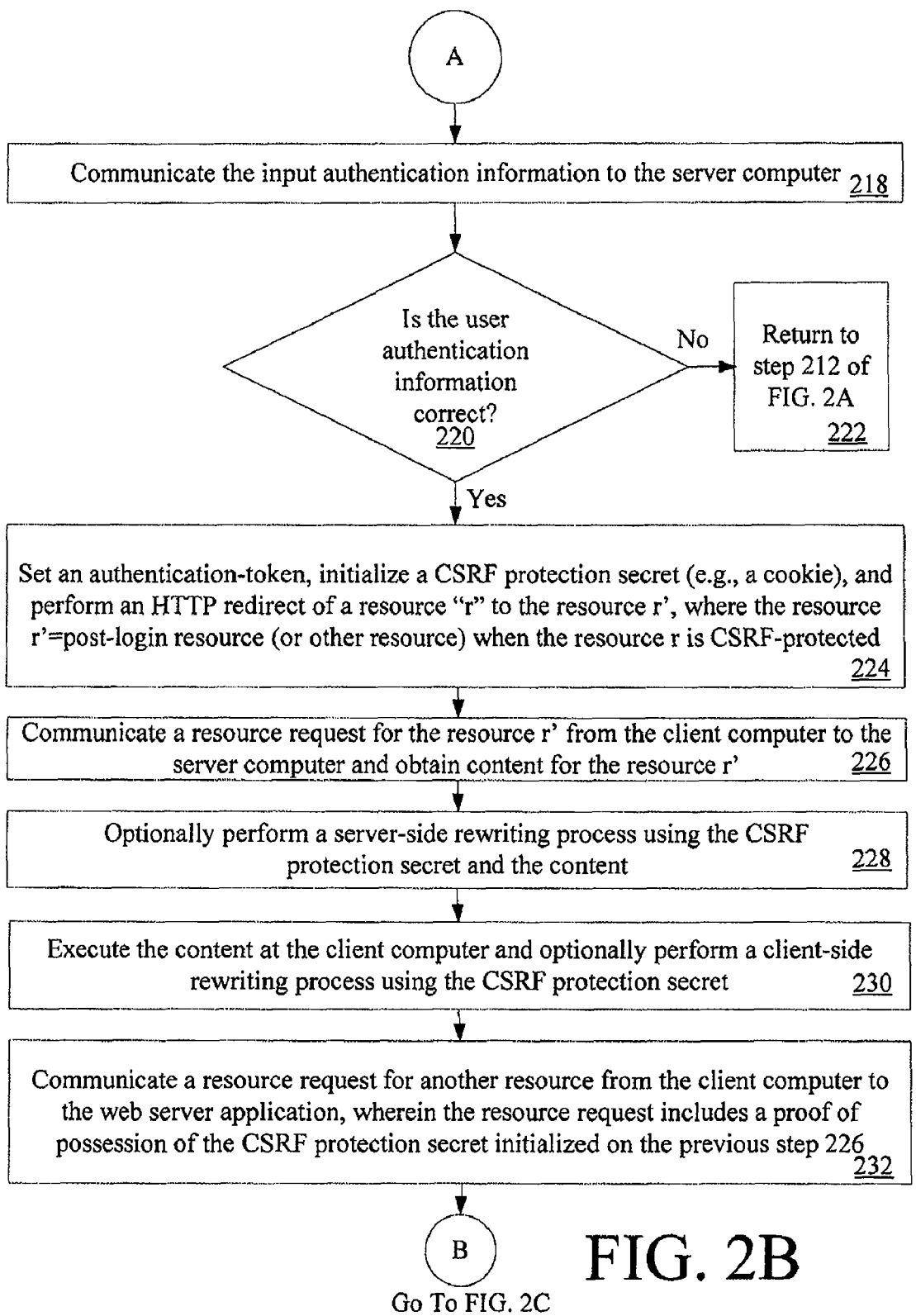

Referring now to FIG. 2B, step 218 is performed where the inputted authentication information is communicated from the client computer directly or indirectly to the server computer. Upon receipt of the authentication information, the server computer verifies the user's identity using the authentication information. More particularly, the server computer determines whether the user authentication information is correct. If the user authentication information is not correct [220: NO], then step 222 is performed where the method 200 returns to step 212 of FIG. 2A.

If the user authentication information is correct [220: YES], then the method 200 continues with step 224 where an authentication-token is set. It should be noted that the CSRF protection can also be used for basic authentication applications, mutual SSL authentication applications, or in other applications where no token (e.g., a cookie) is utilized. The authentication-token can be set by generating a token at the sever computer and setting the authentication-token equal to the generated token. Notably, the value of the authentication-token is stored on the client computer. Authentication-tokens are well known to those having ordinary skill in the art, and therefore will not be described herein. However, it should be understood that the authentication-token is a particular message or bit pattern that identifies a user and/or signifies permission to access certain resources (e.g., a banking web page).

Step 224 can also involve initializing a CSRF protections secret in the browser by the server computer. The CSRF protection secret is generally a token (e.g., a browser site cookie) identifying certain privileges (e.g., the privilege of accessing a particular banking web page) of a user of a client computer. In this regard, it should be understood that step 224 can involve generating a random or pseudo-random number at the server computer and initializing the CSRF protection secret with the generated number. The term "initialize", as used in relation to step 224 means that the value of the CSRF protection secret is set to a particular value. The value can be, but is not limited to, the random number, the pseudo-random number, and a Media Access Control (MAC) address generated using a secret key. The value of the CSRF protection secret is stored on the client computer separate from the authentication-token.

The CSRF protection secret facilitates the security of web applications from CSRF attacks. For example, if a user (not shown) of conventional client-server web based system is accessing a trusted web site www.trusted.com and a malicious web site www.malicious-site.com in different tabs of the browser window, then the malicious site www.malicious-site.com has access to the authentication-token) and can send requests to the server of the trusted web site www.trusted.com for making malicious acts on behalf of the user (not shown). Upon receipt of the request, the server performs the malicious acts requested by the malicious site www.malicious-site.com. In contrast, if a user (not shown) of the system 100 (described above in relation to FIG. 1) is accessing a trusted web site www.trusted.com and a malicious web site www.malicious-site.com in different tabs of the browser window, then the server of the trusted web site www.trusted.com is non-responsive to the request made by the malicious site www.malicious-site.com. This unresponsiveness by the server of the trusted web site www.trusted.com is due to the fact that the request made by the malicious site www.malicious-site.com is absent of a header including the CSRF protection secret or a message generated using the CSRF protection secret. Embodiments of the present invention are not limited in this regard.

Step 224 can further involve performing a Hypertext Transfer Protocol (HTTP) redirect to a resource r', where the resource r'=r when the resource "r" is classified as a not-CSRF-protected resource and the resource r'=post-login resource (assigned to the resource r in step 206 of FIG. 2A) when the resource "r" is classified as a CSRF-protected resource. HTTP redirects are well known to those having ordinary skill in the art, and therefore will not be described herein. It should be understood that the HTTP redirect provides strong-protection to web application because the user authentication does not imply authorization to access resource "r" when the resource "r" is classified as a CSRF-protected resource. In effect, the HTTP redirect ensures that a malicious act (e.g., the erasure of emails or the transfer of funds from a checking account) will not occur immediately after a successful user authentication.

Upon completing step 224, step 226 is performed where a resource request for the resource r' is communicated from the client computer to the server computer. Step 226 also involves obtaining content for the resource r'. Thereafter, an optional step 228 is performed.

In step 228, a server-side rewriting process is optionally performed using the CSRF protection secret and the content. An exemplary server-side rewriting process will be described below in relation to FIG. 3. However, it should be understood that the server-side rewriting process is performed for particular web pages which are CSRF protected, i.e., selected links for web pages are modified so that the web pages cannot be accessed by the client computer without the client computer providing the CSRF protection secret. The selected links can be the links which are presented to the user by means of resource r' in step 226. For example, if the resource r' is an online banking web page which has a set of links (e.g., a checking account link and a saving account link) for accessing confidential information, then the server computer modifies the URLs/URIs of the links to include a CSRF protection parameter that is to be validated against the CSRF protection secret included in a resource request. Embodiments of the present invention are not limited in this regard.

Upon completing the server-side rewriting process, an optional step 230 is performed where the content is executed at the client computer (e.g., displays an image, displays a web page, or displays an updated web page) and a client-side rewriting process is optionally performed using the CSRF protection secret. If the resource is a web page, then the content can include one or more links to other resources. The client-side rewriting process is performed for protecting from CSRF attacks any code dynamically generated at the client computer. A client computer can dynamically generate code for purposes of building a web page or updating a portion of a web page. Such dynamically generated code can include, but is not limited to, Hyper Text Markup Language (HTML) pages, Extensible Markup Language (XML) files, HTML documents and HTML images. The client-side rewriting process can generally involve modifying URLs/URIs of resources to include CSRF protection parameters that are to be validated at the client computer against the CSRF protection secret included in a resource request.

According to an embodiment of the invention, step 230 involves rewriting the dynamically generated code such that any resource request made by the dynamically generated code or enabled by the dynamically generated code will include the CSRF protection secret. In particular, step 230 involves modifying the web application running inside the web browser application (e.g., the web browser application 110 of FIG. 1) and/or modifying an interface used by the web browser application to include a wrapper. The interface may initially be implemented by a web browser application (e.g., the web browser application 110 of FIG. 1) or be implemented by a framework used by the web browser application. The wrapper can include, but is not limited to, code that will add the CSRF protection secret to resource requests made by the dynamically generated code or enabled by the dynamically generated code. Embodiments of the present invention are not limited in this regard.

Subsequent to completing the client-side rewriting process, step 232 is performed where a resource request for another resource is communicated from the client computer to the server computer. For example, this resource request can be initiated by a user selecting one of a number of available links which are presented by the resource r' in step 230. Notably, the resource request includes a proof of possession of the CSRF protection secret initialized in the previous step 224. The proof of possession can be implemented by (a) including the CSRF protection secret in a header of the resource request, (b) including the CSRF protection secret in a URI parameter of the resource request, or (c) including a Hashed Message Authentication Code (HMAC) in the resource request. The HMAC can be generated using the CSRF protection secret. The HMAC can be included in a URI parameter of the resource request. Thereafter, the method 200 continues with a decision step 234 of FIG. 2C.

Figure 2C:
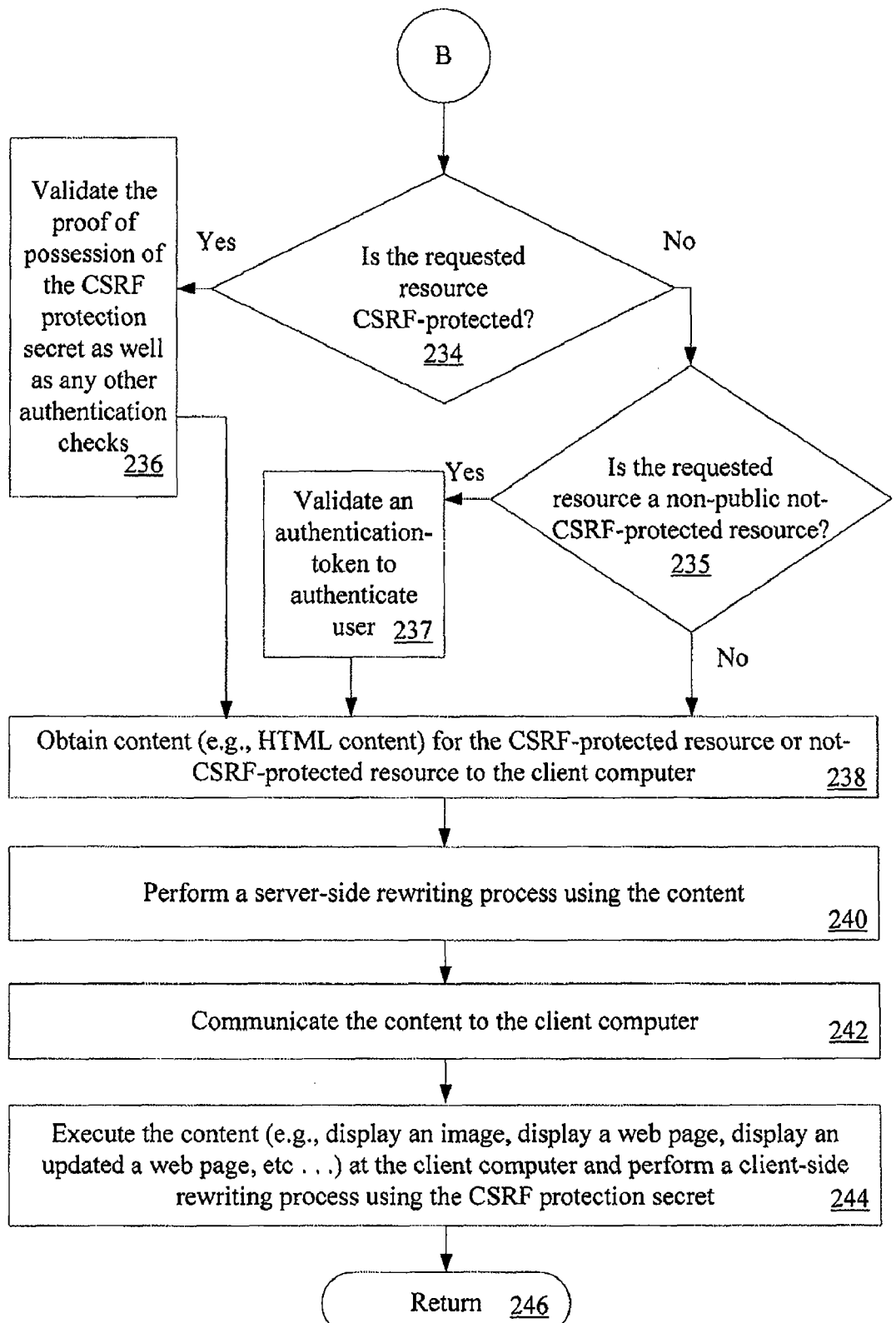

Referring now to FIG. 2C, the decision step 234 is performed for determining if the request resource is classified as a CSRF-protected resource. If the requested resource is classified as a CSRF-protected resource [234:YES], then step 236 is performed where the proof of possession is validated. Step 236 can involve validating the proof of possession against a CSRF protection parameter of a URL/URI of the resource. Step 236 can also involve validating any other authentication checks, such as validating a token (e.g., a cookie) indicating that the user (not shown) is part of an organization. After step 236, the method 200 continues with step 238. If the request resource is not classified as a CSRF-protected resource [234: NO], then a decision step 235 is performed.

If the requested resource is not a non-public not-CSRF-protected resource [235: NO], then the method 200 continues with step 238. However, if the requested resource is a non-public not-CSRF-protected resource [235: YES], then step 237 is performed. Step 237 involves validating an authentication-token to authenticate a user. Thereafter, the method 200 continues with step 238.

Step 238 involves obtaining content for the CSRF-protected resource or not-CSRF-protected resource. The content can include, but is not limited to, HTML images, HTML documents, and HTML web pages. Subsequently, the method 200 continues with step 240 where a server-side rewriting process is performed using the content. An exemplary server-side rewriting process will be described below in relation to FIG. 3. However, it should be understood that the server-side rewriting process can be performed for modifying URLs of the content to include a CSRF protection parameter that is to be validated against the CSRF protection secret included in a resource request.

Upon completing the server-side rewriting process, step 242 is performed where the content is communicated to the client computer. In step 244, the client computer executes the content (e.g., displays an image, displays a web page, or displays an updated web page). Step 244 can also involve performing a client-side rewriting process using the CSRF protection secret. Thereafter, step 246 is performed where the method 200 returns to step 202 or other processing is resumed.

Figure 3:
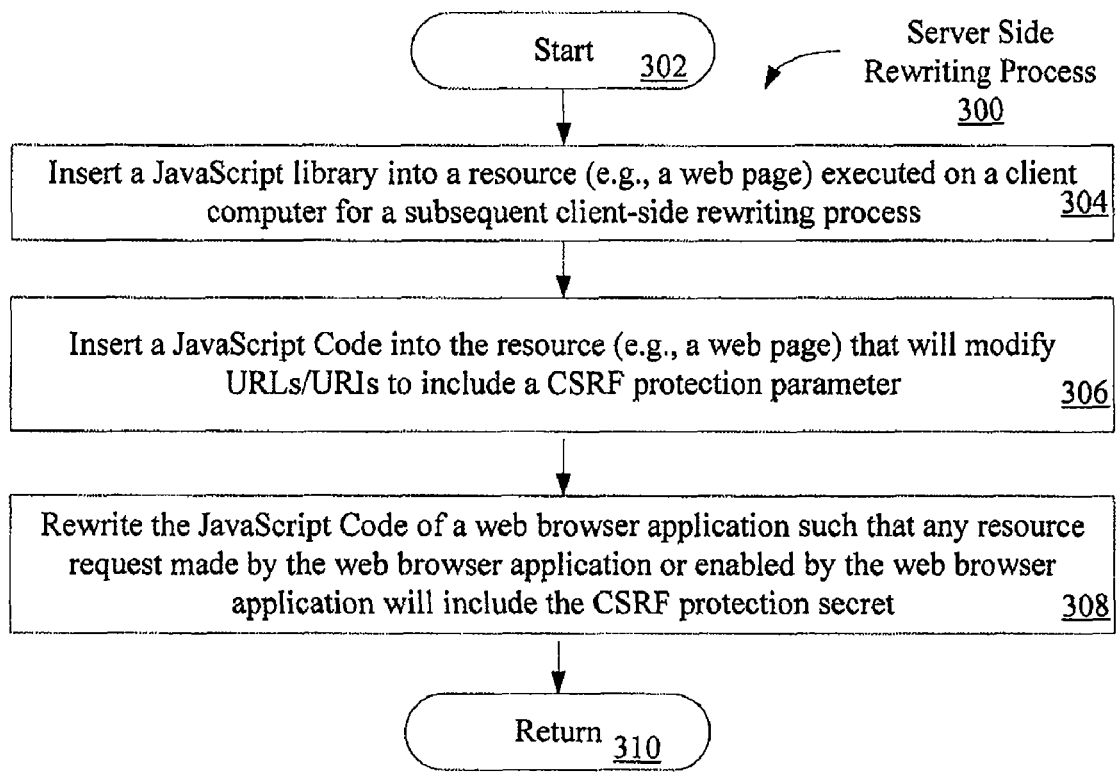
FIG. 3 is a flow diagram of an exemplary server-side rewriting process according to an embodiment of the present invention.

Referring now to FIG. 3, there is provided a flow diagram of an exemplary server-side rewriting process 300 according to an embodiment of the present invention. Notably, the server-side rewriting process 300 can be performed for controlling which links of particular web pages are CSRF protected. For example, if an online banking web page has a set of links (e.g., a checking account link and a saving account link) for accessing confidential information, then the server computer modifies URLs of the links to include a CSRF protection parameter that is to be validated against the CSRF protection secret included in a resource request. Embodiments of the present invention are not limited in this regard.

As shown in FIG. 3, the server-side rewriting process 300 starts at step 302 and continues to step 304. In step 304, a JavaScript library is inserted into a resource (e.g., a web page). The JavaScript library facilitates a client-side rewriting process (described above in relation to FIG. 2) using dynamically generated code. JavaScript libraries are well known to those having ordinary skill in the art, and therefore will not be described in detail herein. However, it should be understood that the JavaScript library generally comprises prewritten JavaScript controls which allow the modification of URLs/URIs of a resource associated with code dynamically generated at a client computer.

Subsequent to completing step 304, the server-side rewriting process 300 continues with step 306. In step 306, a JavaScript Code is inserted into the resource (e.g., a web page). The JavaScript Code is code that will modify static and/or dynamic URLs/URIs to prove possession of a CSRF protection secret. For example, the JavaScript Code can be an "onclick" event handler included in links to other resources, wherein the "onclick" event handler is configured for adding a proof of possession of the CSRF protection secret to URLs/URIs. The JavaScript Code can also replace image tags contained in a resource (e.g., a web page), wherein the JavaScript Code can add image tags to a resource such that image URLs/URIs include proof of possessions of the CSRF protection secret. Embodiments of the present invention are not limited in this regard.

After completing step 306, the server-side rewriting process 300 continues with step 308. Step 308 involves rewriting the JavaScript Code of the web browser application (e.g., the web browser application 110 of FIG. 1) such that any resource request made by the web browser application or enabled by the web browser application will include the CSRF protection secret. Step 308 can involve modifying the web browser application JavaScript Code and/or wrapping an interface used by the web browser application with a wrapper. The interface may initially be implemented by a web browser application or be implemented by a framework used by the web browser application. The wrapper can include, but is not limited to, code that will add the CSRF protection secret to resource requests made by the web server application or enabled by the web server application. Subsequent to step 308, step 310 is performed where the server-side rewriting process 300 returns to step 302 or other processing is resumed.

Figure 4:
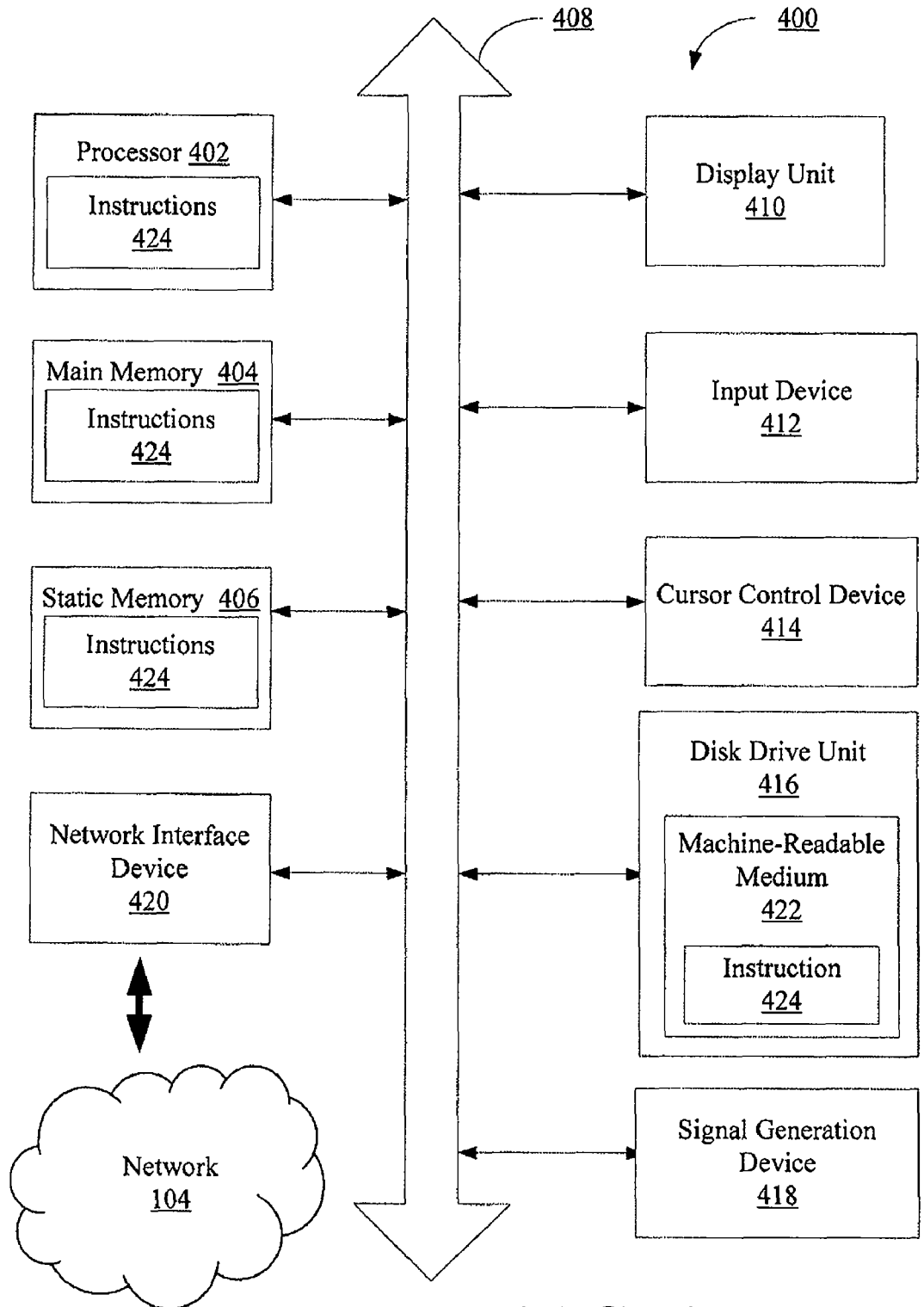
FIG. 4 is a schematic view of a computer system within which a set of instructions operate according to an embodiment of the present invention.

Referring now to FIG. 4, there is provided a schematic diagram of a computer system 400 for executing a set of instructions that, when executed, can cause the computer system to perform one or more of the methodologies and procedures described above in relation to FIGS. 2A-3. It should be understood that the client computer 102 and/or the server computer 106 can be the same as or substantially similar to the computer system 400. As such, the description provided below in relation to the computer system 400 is sufficient for understanding how the computers 102, 106 can execute a set of instructions that cause the computer 102, 106 to perform at least a portion of the method 200 (described above in relation to FIG. 2).

Referring again to FIG. 4, the computer system 400 can operate as a standalone device. However in other embodiments, the computer system 400 can be connected (e.g., using the network 104 described above in relation to FIG. 1) to other computing devices. In a networked deployment, the computer system 400 can operate in the capacity of a server/client developer machine in server-client developer network environment or as a peer machine in a peer-to-peer (or distributed) network environment.

The machine can comprise various types of computing systems and devices, including a server computer, a client computer, a personal computer (PC), a tablet PC, a laptop computer, a desktop computer, a control system, a network router, a switch, a bridge, or any other device capable of executing a set of instructions (sequential or otherwise) that specifies actions to be taken by that device. It is to be understood that a device of the present disclosure also includes any electronic device that provides voice, video or data communication. Further, while a single computer is illustrated, the phrase "computer system" shall be understood to include any collection of computing devices that individually or jointly execute a set (or multiple sets) of instructions to perform any one or more of the methodologies discussed herein.

The computer system 400 comprises a processor 402. The processor 402 can include, but is not limited to, a central processing unit and a graphics processing unit. The computer system 400 also comprises a main memory 404 and a static memory 406, which communicate with each other via a bus 408. The computer system 400 can further comprises a display unit 410, an input device 412, a cursor control device 414, a disk drive unit 416, a signal generation device 418, and a network interface device 420. The display unit 410 can include, but is not limited to, a video display (not shown), a flat panel display (not shown), a solid state display (not shown), or a cathode ray tube (not shown). The input device 412 can include, but is not limited to, a keyboard (not shown). The cursor control device 414 can include, but is not limited to, a mouse (not shown). The signal generation device 418 can include, but is not limited to, a speaker (not shown) and a remote control (not shown).

The disk drive unit 416 comprises a computer-readable storage medium 422 on which is stored one or more sets of instructions 424 (e.g., software code) configured to implement one or more of the methodologies, procedures, or functions described herein. The instructions 424 can also reside, completely or at least partially, within the main memory 404, the static memory 406, and/or the processor 402 during execution thereof by the computer system 400. The main memory 404 and the processor 402 also can constitute machine-readable media.

Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the exemplary system is applicable to software, firmware, and hardware implementations.

In accordance with various embodiments of the present disclosure, the methods described herein can be stored as software programs in a computer-readable storage medium and can be configured for running on a computer processor. Furthermore, software implementations can include, but are not limited to, distributed processing, component/object distributed processing, parallel processing, virtual machine processing, which can also be constructed to implement the methods described herein.

The present disclosure contemplates a computer-readable storage medium containing instructions 424 or that receives and executes instructions 424 from a propagated signal so that a device connected to a network environment 426 can send or receive voice and/or video data, and that can communicate over the network (e.g., the network 104 of FIG. 1) using the instructions 424. The instructions 424 can further be transmitted or received over a network 426 via the network interface device 420.

While the computer-readable storage medium 422 is shown in an exemplary embodiment to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to, solid-state memories such as a memory card or other package that houses one or more read-only (non-volatile) memories, random access memories, or other re-writable (volatile) memories; magneto-optical or optical medium such as a disk or tape; as well as carrier wave signals such as a signal embodying computer instructions in a transmission medium; and/or a digital file attachment to e-mail or other self-contained information archive or set of archives considered to be a distribution medium equivalent to a tangible storage medium. Accordingly, the disclosure is considered to include any one or more of a computer-readable medium or a distribution medium, as listed herein and to include recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments can be utilized and derived therefrom, such that structural and logical substitutions and changes can be made without departing from the scope of this disclosure. Figures are also merely representational and can not be drawn to scale. Certain proportions thereof may be exaggerated, while others may be minimized. Accordingly, the specification and drawings are to be regarded in an illustrative rather than a restrictive sense.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

We claim:

1. A computer implemented method for protecting web based applications from Cross Site Request Forgery (CSRF) attacks, comprising the acts of:

classifying each of a plurality of first resources offered by a web server application as a CSRF-protected resource or a not-CSRF-protected resource;

performing at least a portion of a user authentication process by verifying a user's identity using authentication information received at a server computer;

initializing an authentication-token to be validated by said server computer, said authentication-token identifying a user and signifying permission to access certain resources of said plurality of first resources;

initializing a CSRF protection secret to be used to validate a proof of possession of said CSRF protection secret contained in a first resource identifier or a first resource header for at least one resource of said plurality of first resources;

receiving a first request for said resource at said server computer, said first request including (a) said authentication-token and (b) said CSRF protection secret or a message generated using said CSRF protection secret;

in response to receiving said first request, determining which content of said resource references CSRF-protected resources;

modifying said content of said resource, which was determined to reference CSRF-protected resources, to include a CSFR protected parameter that is to be validated against said CSRF protection secret included in a second request for a CSRF-protected resource referenced by said content or used to generate said message included in said second request.

2. The computer implemented method according to claim 1, further comprising the act of assigning at least one of said first resources that is classified as a not-CSRF-protected resource as a post-login resource for each of said first resources that is classified as said CSRF-protected resource.

3. The computer implemented method according to claim 2, further comprising redirecting a request for one of said first resources that is classified as a CSRF-protected resource to said post-login resource.

4. The computer implemented method according to claim 1, further comprising inserting at least one prewritten control into one of said first resources which facilitates a modification of at least one second resource identifier for at least one second resource generated at a client computer.

5. The computer implemented method according to claim 1, further comprising inserting at least one prewritten control into code for said web server application which facilitates modifications of said first resource identifier and/or said first resource header.

6. The computer implemented method according to claim 1, further comprising inserting at least one prewritten control into code for a web browser application which facilitates an inclusion of said proof of possession of said CSRF protection secret in a resource request generated by or enabled by said web browser application.

7. The computer implemented method according to claim 1, wherein the act of initializing said CSRF protection secret further comprises generating a random number at said server computer and setting a value of said CSRF protection secret equal to said random number.

8. A computer implemented method for protecting web based applications from Cross Site Request Forgery (CSRF) attacks, comprising the acts of:

performing at least a portion of a user authentication process by obtaining authentication information from a user of a client computer and communicating said authentication information from said client computer to a server computer;

storing an authentication-token and a CSRF protection secret received from said server computer, said authentication-token identifying a user and signifying permission to access certain resources of a plurality of first resources, and said CSRF protection secret being useful for validating a proof of possession of said CSRF protection secret contained in a first resource identifier or a first resource header for at least one resource of said plurality of first resources;

determining which content of said plurality of first resources reference CSRF-protected resources; and modifying said content of said plurality of first resources, which was determined to reference CSRF-protected resources, to include a CSRF protected parameter that is to be validated against said CSRF protection secret included in a request for a CSRF-protected resource referenced by said content or used to generated a message included in said request.

9. The computer implemented method according to claim 8, further comprising inserting at least one prewritten control into code for a resource of said plurality of first resources which facilitates an inclusion of said proof of possession of said CSRF protection secret in a resource request generated by or enabled by said resource.

10. The computer implemented method according to claim 8, further comprising the act of generating a resource request for a resource offered by a web server application, wherein the resource request comprises said CSRF protection secret.

11. A system configured for protecting web based applications from Cross Site Request Forgery (CSRF) attacks, comprising:

at least one server computing device configured to:

initialize an authentication-token subsequent to a user authentication, said authentication-token identifying a user and signifying permission to access certain resources of a plurality of first resources;

initialize a CSRF protection secret that is to be used to validate a proof of possession of said CSRF protection secret contained in a first resource identifier or a first resource header for at least one resource of a plurality of first resources provided by a web server application;

receive a first request for said resource, said first request including (a) said authentication-token and (b) said CSRF protection secret or a message generated using said CSRF-protected resources;

in response to receiving said first request, determine which content of said resource references CSRF-protected resources; and modify said content of said resource, which was determined to reference CSRF-protected resources, to include a CSRF protected parameter that is to be validated against said CSRF protection secret included in a second request for a CSRF-protected resource referenced by said content or used to generate said message included in said second request.

12. The system according to claim 11, wherein said server computing device is further configured to assign one of said first resources that is classified as a not-CSRF-protected resource as a post-login resource for each of said first resources that is classified as a CSRF-protected resource.

13. The system according to claim 12, wherein said server computing device is further configured to redirect a request for one of said first resources that is classified as said CSRF-protected resource to said post-login resource.

14. The system according to claim 11, wherein said server computing device is further configured to insert at least one prewritten control into one of said first resources which facilitates a modification of a second resource identifier for a second resource generated at a client computing device.

15. The system according to claim 11, wherein said server computing device is further configured to insert at least one prewritten control into code for said web server application which facilitates a modification of said first resource identifier and/or said first resource header.

16. The system according to claim 11, wherein said server computing device is further configured to insert at least one prewritten control into code for a web browser application which facilitates an inclusion of said proof of possession of said CSRF protection secret in a resource request generated by or enabled by said web browser application.

17. The system according to claim 11, further comprising at least one client computing device for performing a client-side rewriting process to add said proof of possession of said CSRF protection secret to a second resource identifier for at least one second resource.

18. The system according to claim 11, wherein said client computing device is further configured to insert at least one prewritten control into code for said at least one second resource which facilitates an inclusion of said proof of possession of said CSRF protection secret in a resource request generated by or enabled by said at least one second resource.

19. The system according to claim 11, wherein said client computing device is further configured to generate a resource request for a first resource of said plurality of first resources comprising said CSRF protection secret.

20. The system according to claim 19, wherein said server computing device is further configured to validate said CSRF protection secret against said proof of possession of said CSRF protection secret included in said first resource identifier for said first resource of said plurality of first resources.

* * * * *